United States Patent [19]

Sokol et al.

[11] Patent Number: 4,688,123
[45] Date of Patent: Aug. 18, 1987

[54] CARTRIDGE HANDLING DEVICE AND METHOD

[75] Inventors: Gary L. Sokol; Michael J. Steen, both of Longmont; Douglas A. Stephen, Boulder, all of Colo.

[73] Assignee: International Business Machines Corporation, Armonk, N.Y.

[21] Appl. No.: 744,428

[22] Filed: Jun. 13, 1985

[51] Int. Cl.⁴ ............................................. G11B 17/04
[52] U.S. Cl. ........................................ 360/97; 360/99
[58] Field of Search .................... 360/97, 99, 133, 105

[56] References Cited

U.S. PATENT DOCUMENTS

| | | | |
|---|---|---|---|
| 4,040,106 | 8/1977 | Medley | 360/99 |
| 4,193,102 | 3/1980 | Beuch et al. | 360/105 |
| 4,445,157 | 4/1984 | Takahashi | 360/133 |
| 4,536,813 | 8/1985 | Saito | 360/99 X |
| 4,539,613 | 9/1985 | Suyama et al. | 360/99 |
| 4,604,666 | 8/1986 | Kitahara et al. | 360/99 |

FOREIGN PATENT DOCUMENTS

| | | |
|---|---|---|
| 0120180 | 3/1984 | European Pat. Off. . |
| 0120124 | 3/1984 | European Pat. Off. . |
| 2142464 | 1/1985 | United Kingdom . |
| 2155233 | 9/1985 | United Kingdom . |

*Primary Examiner*—John H. Wolff
*Attorney, Agent, or Firm*—Robert E. Harris

[57] ABSTRACT

A cartridge handling device and method for loading and unloading a rigid, diskette-containing cartridge into and from a diskette drive mechanism of a recording/reproducing apparatus. The cartridge is moved rearwardly in the cartridge area to cause the shutter of the cartridge to be opened and a latch mechanism actuated to cause movement of a lifter mechanism in the direction opposite to that of the inserting direction of the cartridge, which movement of the lifter mechanism permits the carrier unit to slide toward the base unit to the cartridge loaded position. Ejection of the cartridge is effected by depressing an eject button to slide the lifter mechanism rearwardly to force the carrier assembly upwardly to the cartridge unloaded position, and this releases the shutter actuator to cause movement of the cartridge from the cartridge area in the ejecting direction a distance sufficient to enable removal of the cartridge.

19 Claims, 10 Drawing Figures

CARTRIDGE HANDLING DEVICE AND METHOD

FIELD OF THE INVENTION

This invention relates to a cartridge handling device and method, and, more particularly, relates to loading and unloading of a rigid, diskette-containing cartridge into and from a diskette drive mechanism of a recording/reproducing apparatus.

BACKGROUND OF THE INVENTION

Recording and/or reproducing apparatus are well known, and such apparatus has heretofore been known which has the capability of reading and/or writing magnetic signals on interchangeable flexible disks.

While such flexible disks have been known which are loosely contained in a flexible cartridge or envelope (as shown and described, for example, in U.S. Pat. No. 4,193,102), it is also known that such disks may be contained in a rigid cartridge (such as shown and described, for example in U.S. Pat. No. 4,445,157). The use of a rigid cartridge has now become commonly utilized with 3½ inch diameter diskettes, and the handling device and method of this invention is designed for use with rigid cartridges.

The rigid envelope, or casing, of such a cartridge normally has a central aperture through which the central core disk at the central aperture of the diskette is engageable for rotational drive of the diskette, and there is also a head access slot through the cartridge near one end portion so that a recording head (or heads) can interact with the surface of the diskette.

The disk access slot is normally closed by a slidable cover which must be moved in a direction normal to direction of inserting movement of the cartridge, before or during loading of the cartridge, to provide head access to the diskette within the cartridge through the head access slot. In addition, a notch is also normally provided at the edge of the cartridge casing having the shutter mounted thereat, and full cartridge insertion is precluded unless the notch is exposed by moving the shutter to the open position to allow a portion of the device to be received in the depression at full insertion of the cartridge.

When a diskette is loaded into the diskette drive mechanism, the slidable cover must therefore be moved to the open position for accessing the diskette, and the cartridge must be precisely positioned to allow the recording/reproducing head (or heads) to contact the diskette at the proper predetermined position through the access slot in the cartridge.

Actuators for lifting and then lowering a recording head for use with floppy disks are well known, and examples of such actuators may be found, for example, in U.S. Pat. Nos. 4,040,106 and 4,193,102.

In addition, devices are known for handling loading and unloading of rigid cartridges, and examples of such devices are shown, for example, in U.S. Pat. No. 4,445,157. In the device shown in U.S. Pat. No. 4,445,157, a pressure member, with compression springs depending therefrom, is utilized above the cartridge to force the cartridge downwardly against positioning pins for positioning the cartridge, and projections are utilized at the rear of the cartridge space to prevent erroneous cartridge positioning. While not shown in U.S. Pat. No. 4,445,157, such devices have heretofore normally included side panels, roller elements, and/or carrier pivot means for effecting positioning of the cartridge in loaded and unloaded positions.

Thus, while diskette handling devices and methods are now known and/or utilized, further improvements thereto are still felt warranted, including reducing manufacturing expense and/or improving the loading/unloading arrangment.

SUMMARY OF THE INVENTION

This invention provides an improved cartridge handling device and method for loading and unloading of a rigid cartridge into and out of a diskette drive mechanism. To accomplish the desired end, sliding movement is utilized, without requiring roller elements, side panels or carrier unit pivoting, and smooth and dependable loading and unloading is realized with unloading requiring only a minimum of force and relatively short stroke of an eject button. The resulting device has a minimum of parts, high reliability, and can be assembled by automation.

It is therefore an object of this invention to provide an improved cartridge handling system and method for loading and unloading a cartridge into and out of a drive mechanism.

With these and other objects in view, which will become apparent to one skilled in the art as the description proceeds, this invention resides in the novel construction, combination, arrangement of parts and method substantially as hereinafter described and more particularly defined by the appended claims, it being understood that changes are meant to be included as come within the scope of the claims.

DESCRIPTION OF THE DRAWINGS

The accompanying drawings illustrate a complete embodiment of the invention according to the best mode so far devised for the practical application of the principles thereof, and in which.

DESCRIPTION OF THE INVENTION

Figure 1:
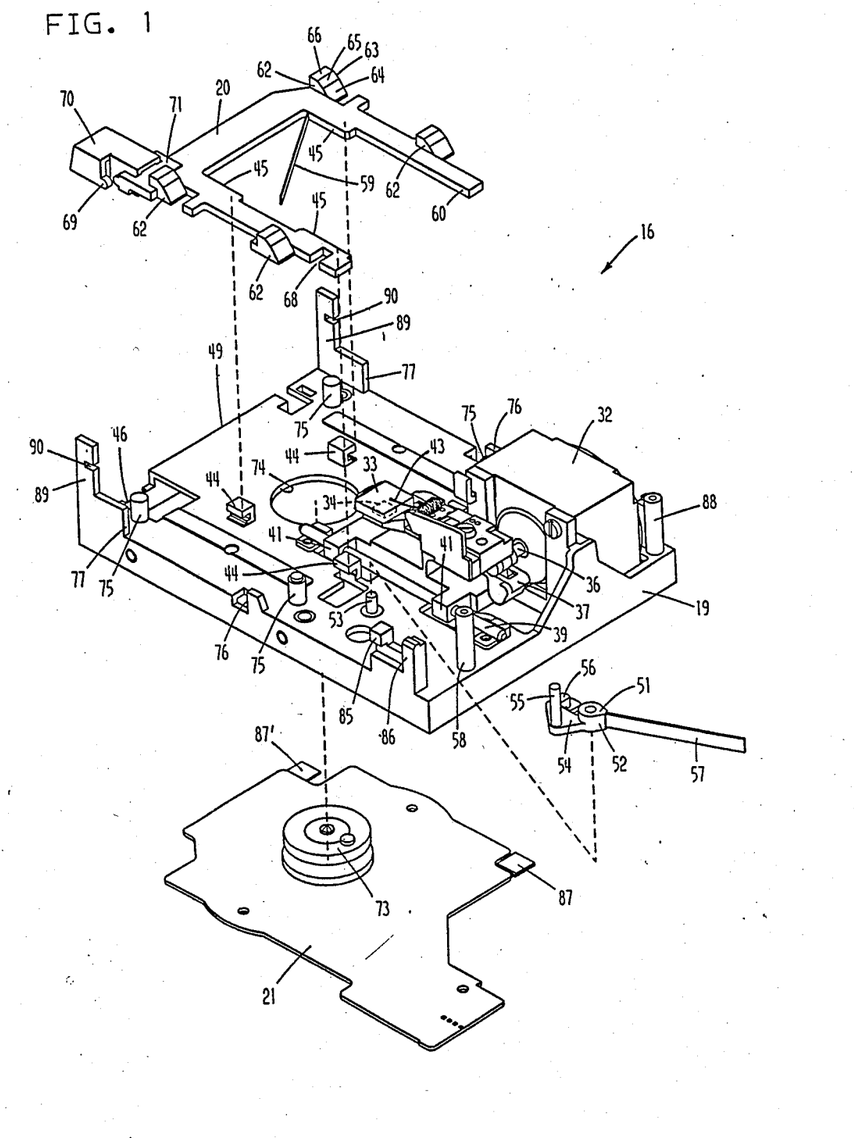
FIG. 1 is an exploded perspective view of the base unit and lifter mechanism of the cartridge handling device of this invention.
Figure 2:
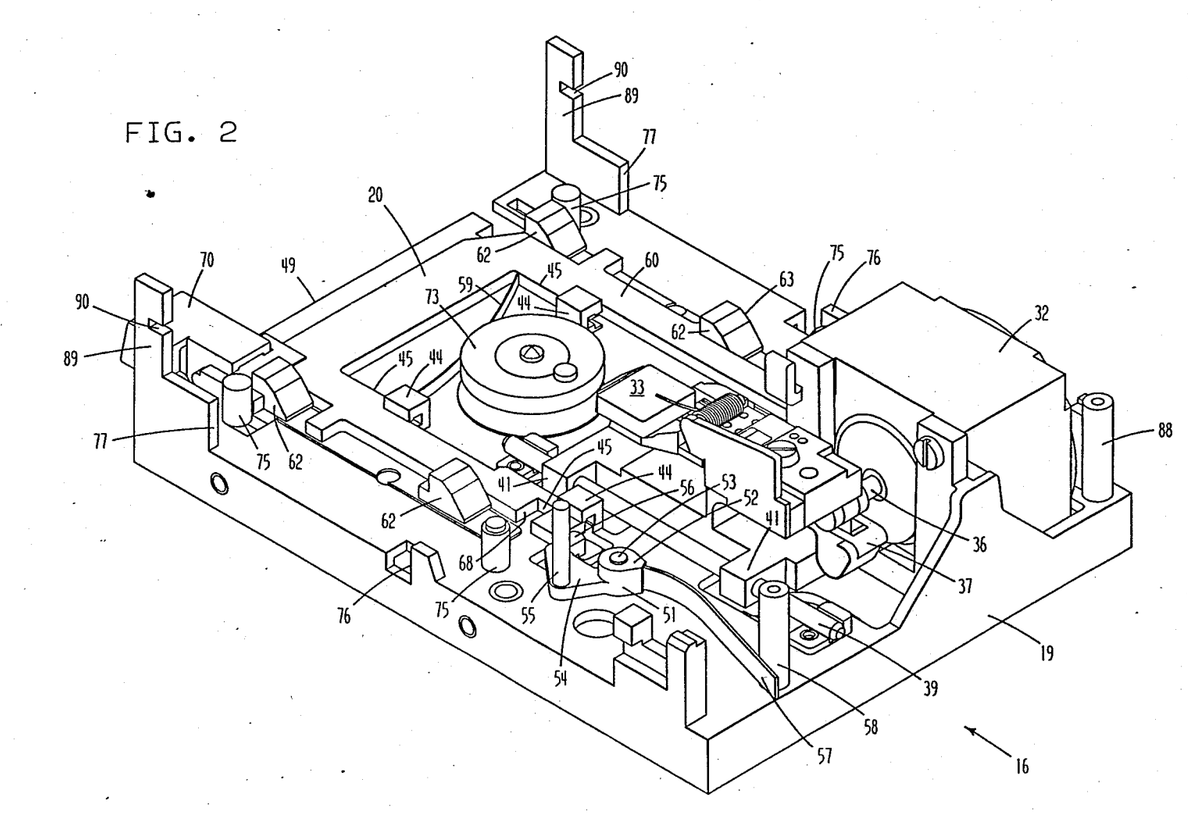
FIG. 2 is a perspective view of the base unit and lifter mechanism, as shown in FIG. 1, assembled.

The cartridge handling system, or device, 14 of this invention (shown assembled in FIG. 6), includes base, or support, unit 16 and a carrier unit 17. Base unit 16 includes, as best shown in FIGS. 1 and 2, a casting 19, a lifter mechanism 20, and a base plate and spindle mount 21.

While cartridge loading device 14, as shown herein, is particularly adapted to use with a three and one-half inch diameter diskette cartridge, as is now typically used in some computer applications, it is to be realized that the invention described herein can be modified, as would be apparent to one skilled in the art, so as to be usable with any diskette cartridge such as shown in FIGS. 7 through 10 of the drawings and as described herein.

While specifically described herein in connection a diskette cartridge, it is to be realized that the cartridge loading device and method of this invention can also be utilized in connection with other systems including, for example, hard disk drives and/or optical drives.

Figure 7:
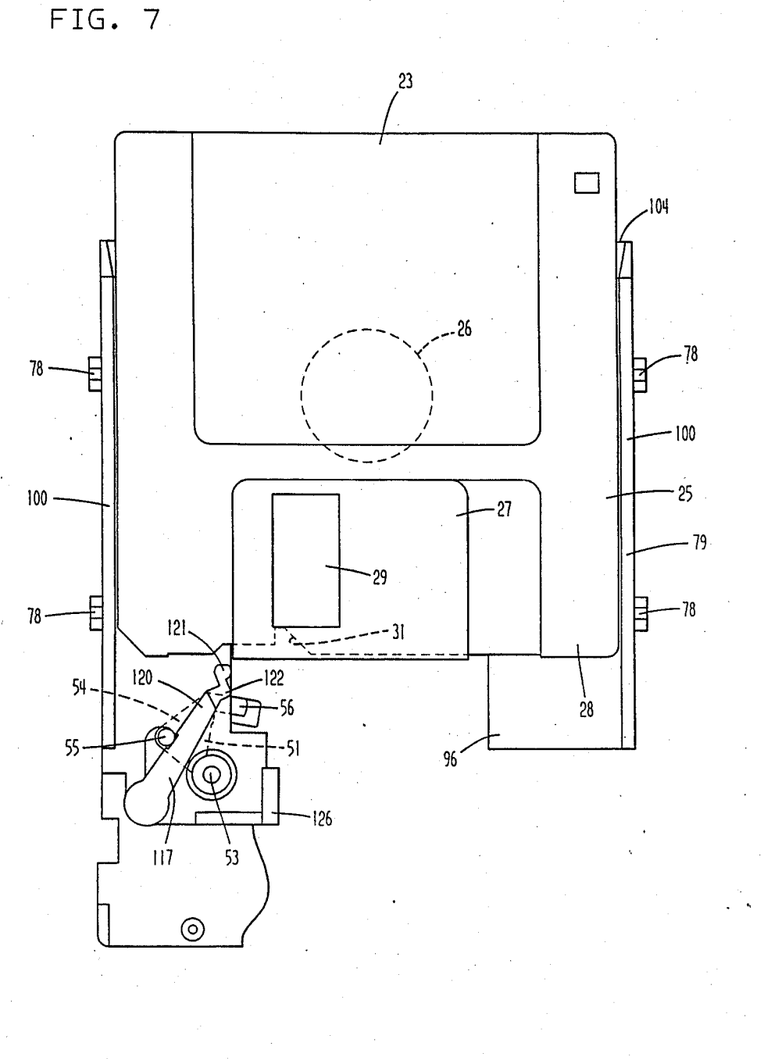
FIGS. 7 through 9 are partial top views of the lower carrier showning the cartridge receiving area with a cartridge being inserted therein, and illustrating shutter actuation and latch operation during loading of the cartridge.
Figure 8:
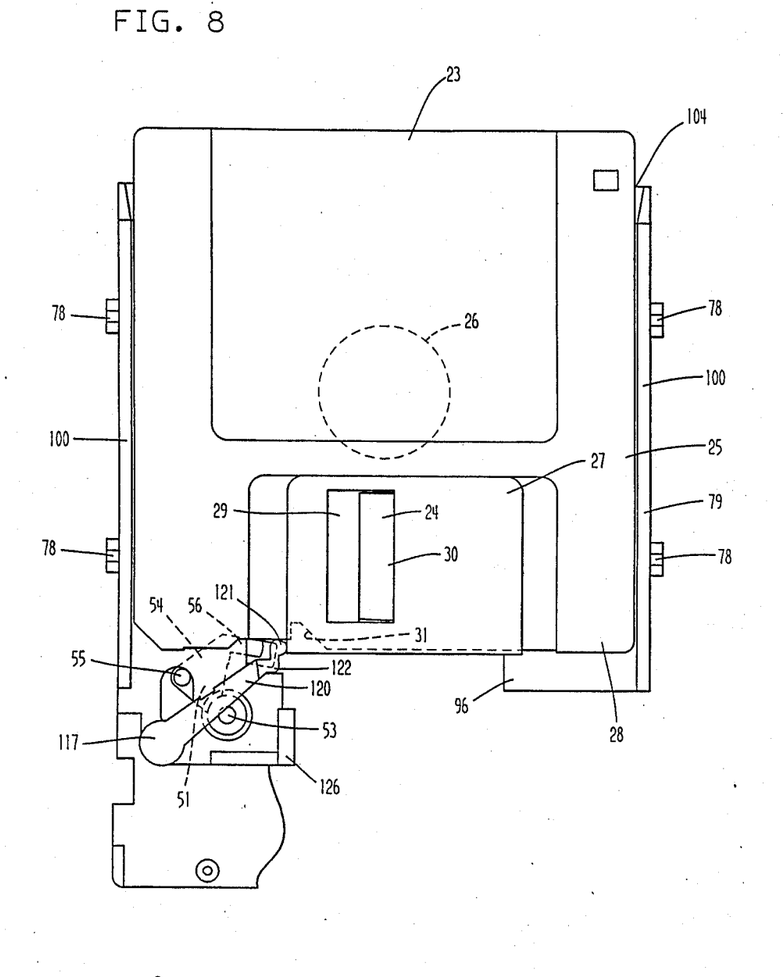
Figure 9:
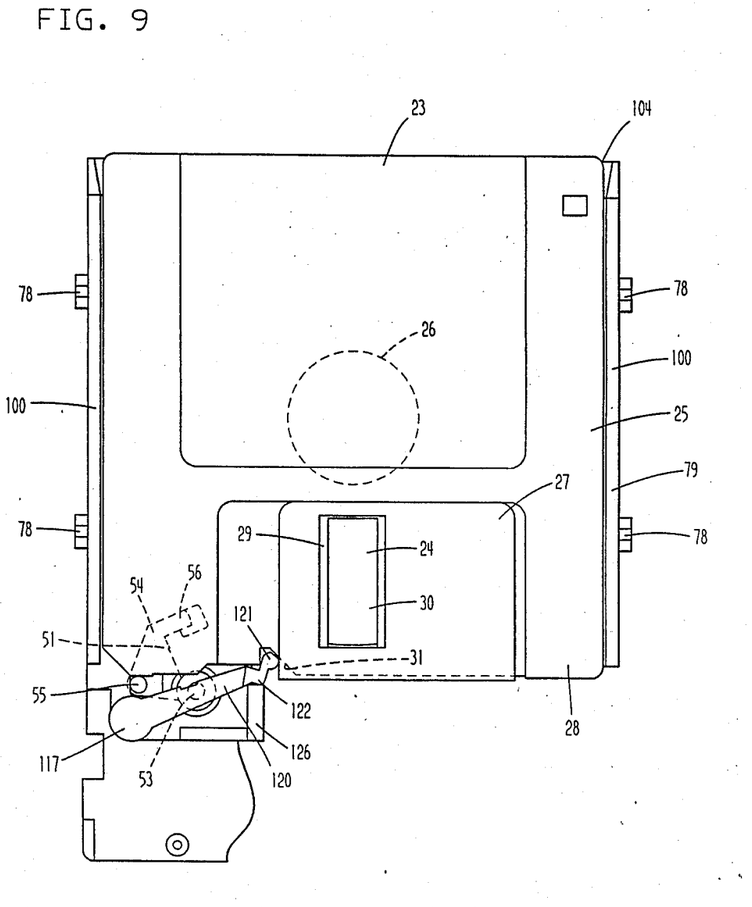

As best shown in FIGS. 7 through 10, such a diskette cartridge 23 normally includes a centrally apertured flexible magnetic diskette 24 within a rigid, or hard, casing 25 (which diskette can be seen in FIGS. 8 and 9 through the partially open (FIG. 8) and fully open (FIG. 9) access aperture in the casing). Casing 25 has a central aperture 26 opening from the bottom side, and a slidable protective cover, or shutter, 27 at the forward portion 28 of the cartridge. Shutter 27 has slots 29 therein, at the top and bottom sides (with only the top slot being illustrated in FIGS. 7 through 10).

As shown by FIG. 7, shutter 27, when in the closed position, covers head access apertures 30 (as illustrated in FIGS. 8 and 9) in the top and bottom sides of the cartridge casing, as well as a notch, or depression, 31 in the edge of the cartridge casing (as illustrated in FIGS. 7 thru 10). When in the open position, shutter 27 allows head access to diskette 24 within casing 25, as is necessary during use.

A diskette cartridge of this type is set forth in greater detail, by way of example, in U.S. Pat. No. 4,445,157, except that the shutter, as contemplated for use with this invention, is normally maintained in the closed position by means of an internal spring (not shown), which automatic shutter actuation to the closed portion is not specifically shown in U.S. Pat. No. 4,445,157.

As best shown in FIGS. 1 and 2, casting 19 of base unit 16 is formed to receive the remainder of the components of the assembly thereon. As shown, stepping motor 32 is mounted on the top side of casting 19 at a rear corner thereof. Stepping motor 32 is connected wtih head mounting unit 33 (having head (or heads) 34 thereon) through motor shaft 36 and head driving mechanism 37.

As is conventional, stepping motor 32 causes head unit 33 to step head (or heads) 34 along a radial line with respect to flexible diskette 24 by causing movement of head mounting unit 33 along guide 39 mounted on casting 19 to maintain the head (or heads) 34 (upper or lower) aligned with the desired track on the diskette. Head (or heads) 34 are maintained contiguous to diskette 24 through the apertures 30 in the cartridge casing when shutter 27 is in the open position (as illustrated in FIG. 9).

As indicated in FIGS. 1 and 2, head unit 33 has an apertured shoulder 41 through which guide rod 39 is received so that head mounting unit 33 can slide with respect to the guide rod. Bias is applied to head mounting unit 33 by means of spring 43.

As also shown best in FIGS. 1 and 2, casting 19 also has lipped holders, or retainers, 44 thereon at the upper side of the casting to receive cooperating tabs, or ears, 45 of lifter mechanism 20 to form a sliding relationship therebetween. When assembled, lifter mechanism 20 is limited to motion forwardly and rearwardly along and with respect to casting 19 and is precluded from movement toward and away from the casting.

Casting 19 also has an eject button mounting ledge 46 mounted adjacent to front edge 49 of casting 19.

As best shown in FIGS. 1 and 2, latch mechanism 51 has an apertured central portion 52 for mounting of the latch mechanism on upstanding post 53 on casting 19 so that latch mechanism 51 can be pivoted along and adjacent to the upper surface of the casting. As shown, latch mechanism 51 has a ledge 54 extending from central portion 52, a cartridge engaging post, or protrusion, 55 extending upwardly from ledge 54, and a latch 56 extending outwardly from one side of ledge 54.

A flat spring 57 extends from central portion 52 in a direction generally opposite to that of ledge 54, with the free end of spring 57 being constrained by post 58 (as shown in FIG. 2) so that, when assembled, bias is applied to the latch mechanism to bias post 55 toward the front of the device. In addition, a return spring 59 is provided on lifter mechanism 20 (as shown in FIGS. 1 and 2).

As best shown in FIGS. 1 and 2, lifter mechanism 20 includes a generally U-shaped slider portion 60 having ears 45 extending from the inner sides of the slides, which ears are slidably receivable in the holders 44 of casting 19. Carrier engaging members 62 are mounted on the outer sides of the slider with each member 62 having a ramp 63 with surfaces 64 and 65 thereon that are inclined at different angles with respect to one another, and a flat top portion 66 for supporting the carrier when in the up, or unloaded, position (as opposed to the down, or loaded, position). While surfaces 64 and 65 are indicated to be planar, these surfaces could be arcuate, if desired.

In addition, latch notch 68 is provided in slider portion 60 of lifter mechanism 20 near one foot thereof, and eject button mechanism 69 is mounted on slider portion 60 at the forward end thereof. Ejector button mechanism 69 includes an actuating button 70 and a bridging portion 71 that is mounted forwardly of ledge 46 of casting 19 with ejector button mechanism 69 being positioned on ledge 46 so that travel of slider portion 60 is limited in both the forwardly and rearwardly directions with respect to base unit 16.

Base cover and spindle mounting plate 21 is secured at the bottom of casting 19 so that spindle 73 extends upwardly through aperture 74 in casting 19. When assembled, spindle 73 extends upwardly a sufficient distance to engage and rotate diskette 24 within cartridge 23 when the cartridge is inserted into the cartridge receiving area and the carrier unit, with the cartridge therein, is in the loaded position. In the loaded position, cartridge 23 is supported by upstanding locating posts 75 on casting 19.

Figure 3:
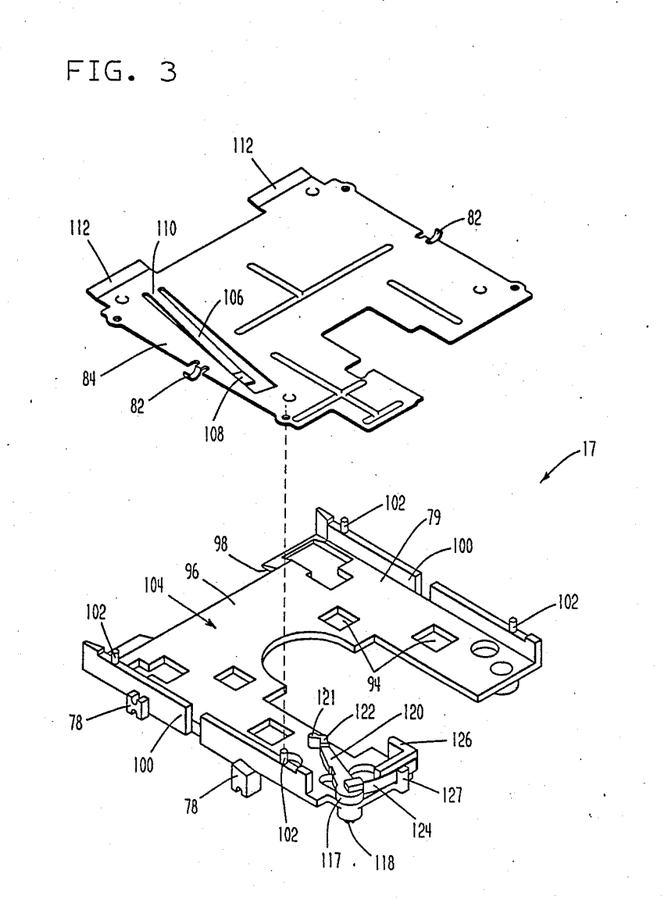
FIG. 3 is an exploded perspective view of the carrier unit of the cartridge handling device of this invention.
Figure 5:
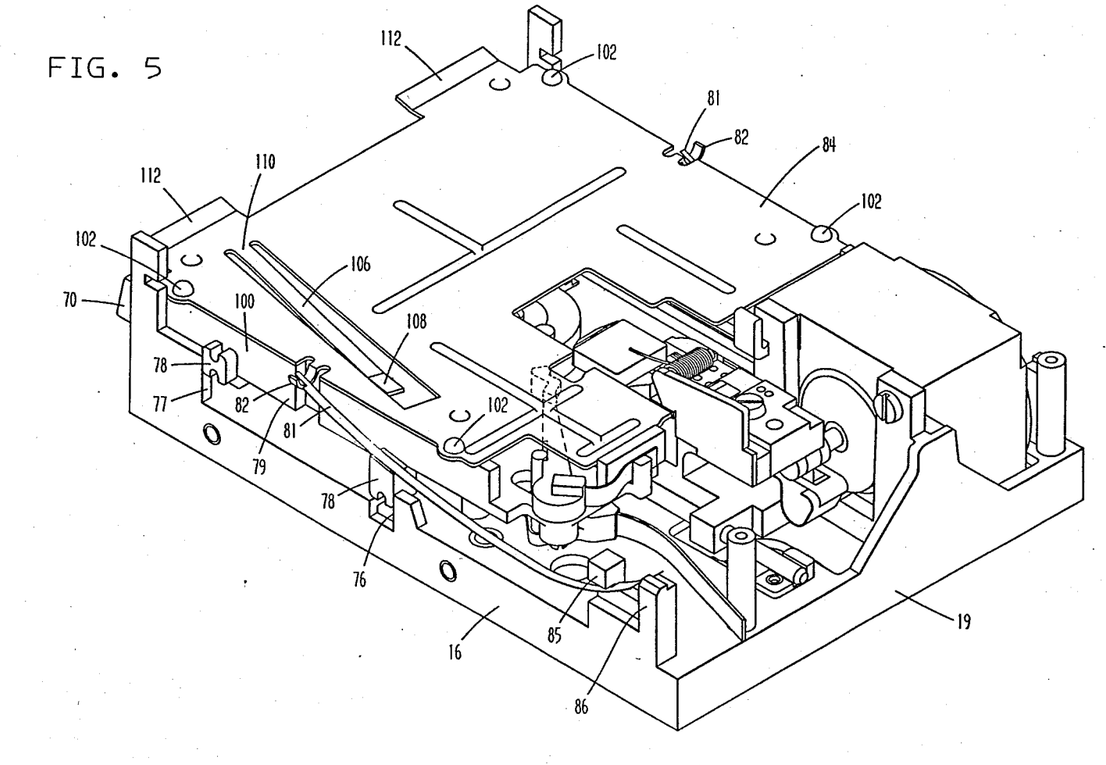
FIG. 5 is a perspective view of the assembled carrier unit, as shown in FIG. 3, mounted on the assembled base unit, as shown in FIG. 2.
Figure 6:
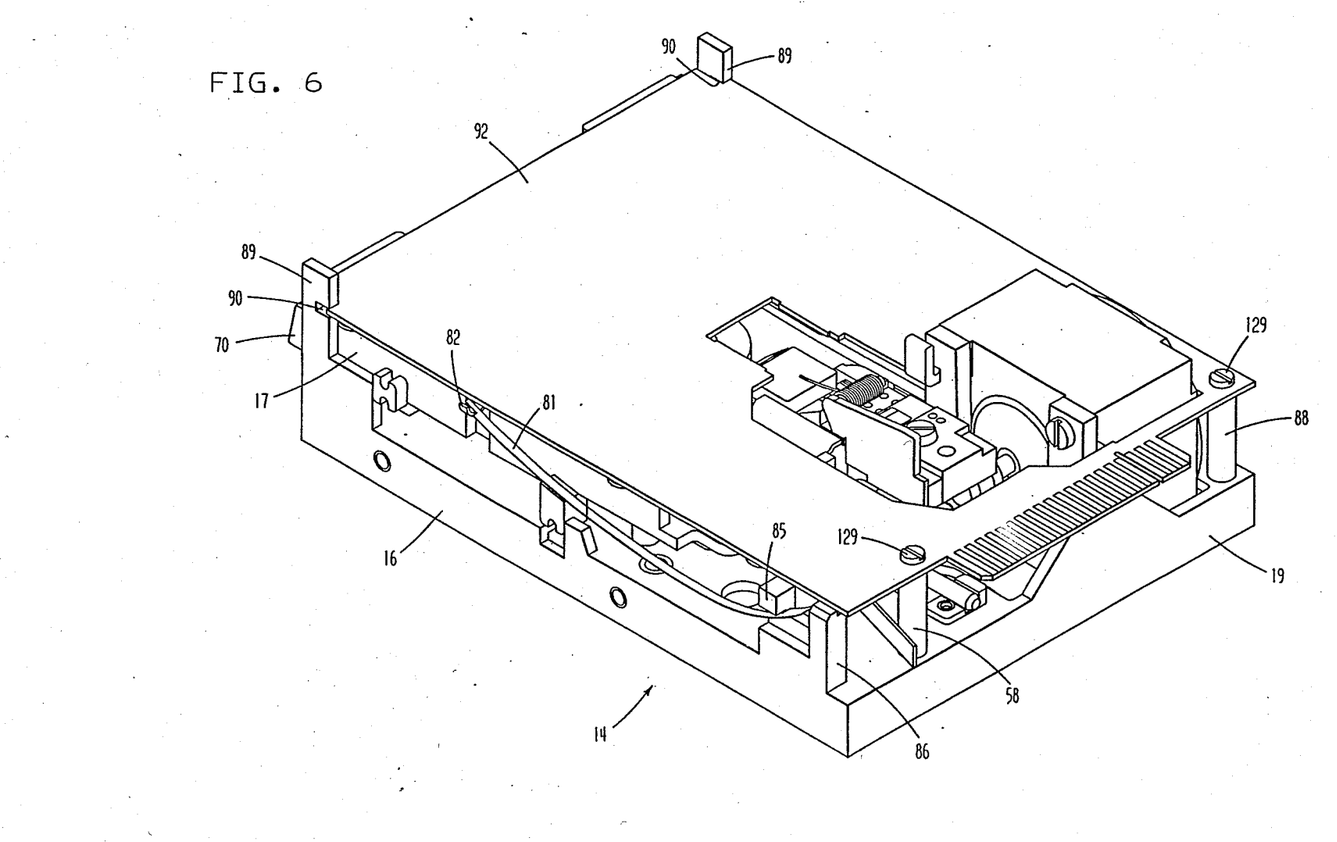
FIG. 6 is a perspective view illustrating the assembly of FIG. 5 with the top cover in place thereon.

As shown in FIGS. 1, 2, 5 and 6, upstanding ears 76 and 77 are provided at each side of casting 19, which ears receive side blocks, or abutments, 78 (which abutments are located on lower carrier 79 of carrier unit 17, as shown best in FIG. 3) so that, when assembled, the ears and slide blocks cooperate to constrain the movement of carrier unit 17 to vertical movement upwardly and downwardly with respect to base unit 16 with no forward or rearward movement therebetween being permitted (as shown best in FIGS. 5 and 6). While the side blocks are visible only on one side of the lower carrier as shown in FIGS. 3, 5 and 6, it is to be appreciated that identical side blocks are present at both sides of the carrier (as indicated in FIGS. 7 through 10).

Bias is applied to carrier unit 17 in the downward direction relative to, and toward, base unit 16 by carrier return flat springs 81 (as shown in FIGS. 5 AND 6) extending, at each side of the device, between tab 82 on carrier plate 84 of carrier unit 17 to lip 85 and protruding mount 85 on casting 19 of base unit 16. As best shown in FIG. 3, carrier plate 84 is a part of carrier unit 17, as is lower carrier 79.

Hall effect sensors 87 and 87', are positioned on the upper side of base plate 21. Sensor 87, senses cartridge presence, and sensor 87' senses the position of the write-project flag carried by the cartridge. Mounts 58, 88 and 89 (mounts 89 have notches 90 therein) extend upwardly from the rear and front portions, respectively, of casting 19 to receive top cover 92 (as shown in FIG. 6) to complete the assembly of the device.

As shown in FIG. 3, lower carrier 79 has various apertures 94 in main wall 96 to allow the necessary movement of the carrier unit with respect to the base unit, a notch 98 at the front edge, upwardly extending side walls 100, and pins 102 extending upwardly from side walls 100 at the top thereof for mounting carrier cover plate 84 thereat.

A cartridge receiving area 104 is established between top cover 84, main wall 96 and side walls 100 to receive cartridge 23 therein, which cartridge is inserted from the front of the unit (i.e., immediately above notch 98 in lower carrier 79 as shown in FIG. 3). Cartridge 23 is then moved rearwardly for loading the cartridge into the device, as brought out more fully hereinafter.

As also best shown in FIG. 3, a biasing arm 106 is provided in carrier cover plate 84. Arm 106 extends downwardly from plate 84 so that the free end 108 of the arm is engageable with a cartridge inserted into cartridge area 104 to provide a cartridge drag spring and to provide downward bias on the cartridge (when in the cartridge area). As shown, biasing arm 106 is preferably integrally formed with respect to carrier cover plate 84 at junction 110. In addition, cartridge guides 112 are provided at the front of the cover plate to assist in guiding a cartridge into cartridge area 104.

Figure 4:
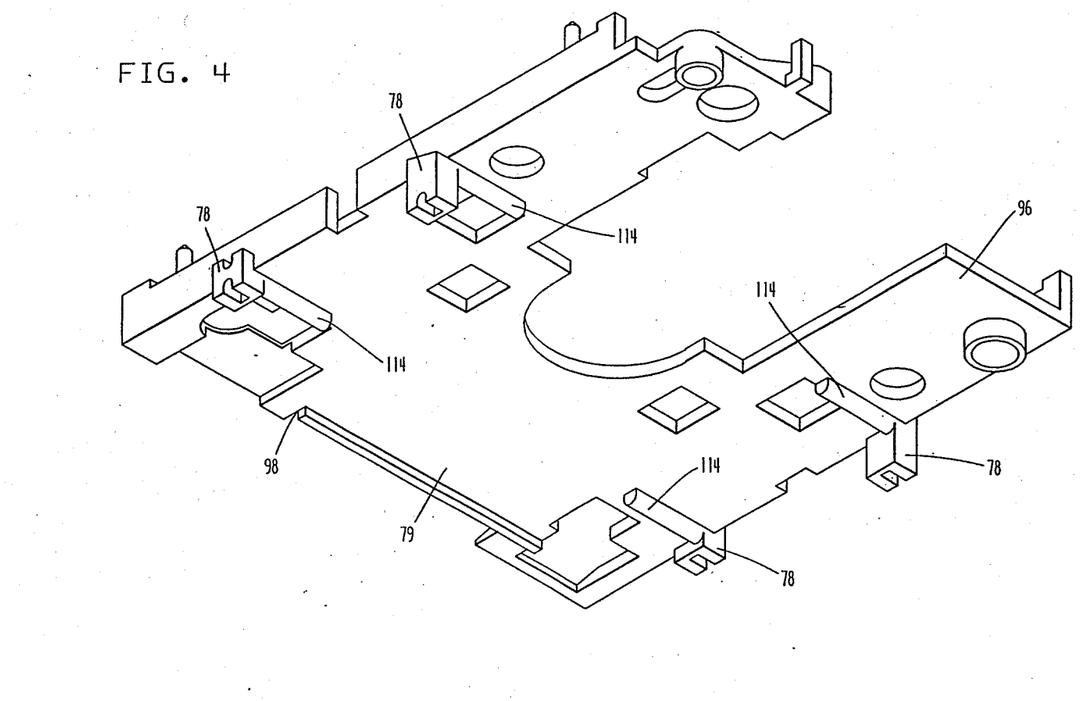
FIG. 4 is a perspective view of a portion of the bottom side of the lower carrier, as shown in FIG. 3, to illustrate the lift profiles thereon.

As shown in FIG. 4, lift profiles 114 are established on the bottom surface of main wall 96 of lower carrier 79. These profiles contact ramps 63 on lifter mechanism 20 for raising, or lifting, the carrier unit as brought out more fully hereinafter.

Shutter actuator 117 is mounted for pivotal movement on pin 118 at the lower rear portion of lower carrier 79. Shutter actuator 117 has an actuating leg 120 extending inwardly along the surface of plate 96 of the lower carrier. Leg 120 terminates at a foot 121 having a protruding heel 122. A shutter actuator return spring 124 extends from shutter actuator 117 in a direction substantially normal to that of leg 120. The end of spring 124 is received between L-shaped stop 126 and post 127, both of which extend upwardly from the rear edge portion of main plate 96 of the lower carrier.

The assembly of the cartridge handling system, or device, of this invention is progressively shown by FIGS. 1 through 6. The various components, as shown in FIG. 1, are mounted on casting 19, after which latch mechanism 51 is inserted onto post 53, button ejector mechanism 69 is snapped onto lifter mechanism 20, lifter mechanism 20 is snapped into place on casting 19, and bottom cover 21 is secured to the bottom of the casting to provide the completed base unit 16 (as shown in FIG. 2).

Carrier unit 17 is assembled by snapping shutter actuator 117 on plate 96, using post 118, and securing top cover 84 onto the top of pins 102 of the lower carrier, as indicated in FIG. 3. The assembled carrier unit 17 is then placed onto the top of the assembled base unit 16 (with side blocks 78 on the lower carrier received between ears 76 and 77 of casting 19), and the flat springs 81 are then installed so that each spring has one end in tab 82 and the other end extending under lip 85 and over mount 86, as indicated in FIG. 5. Top cover 92 (an electronic circuit card) is then placed at the top of the device with the front end received in notches 90 of mounts 89 on casting 19, and with the rear end retained on the top of mounts 58 and 88 by screws 129 to complete the assembly, as shown in FIG. 6.

As can be appreciated from the foregoing, fasteners required for assembly have been largely eliminated, and the number of parts have been substantially reduced to facilitate automatic assembly of the device.

Figure 10:
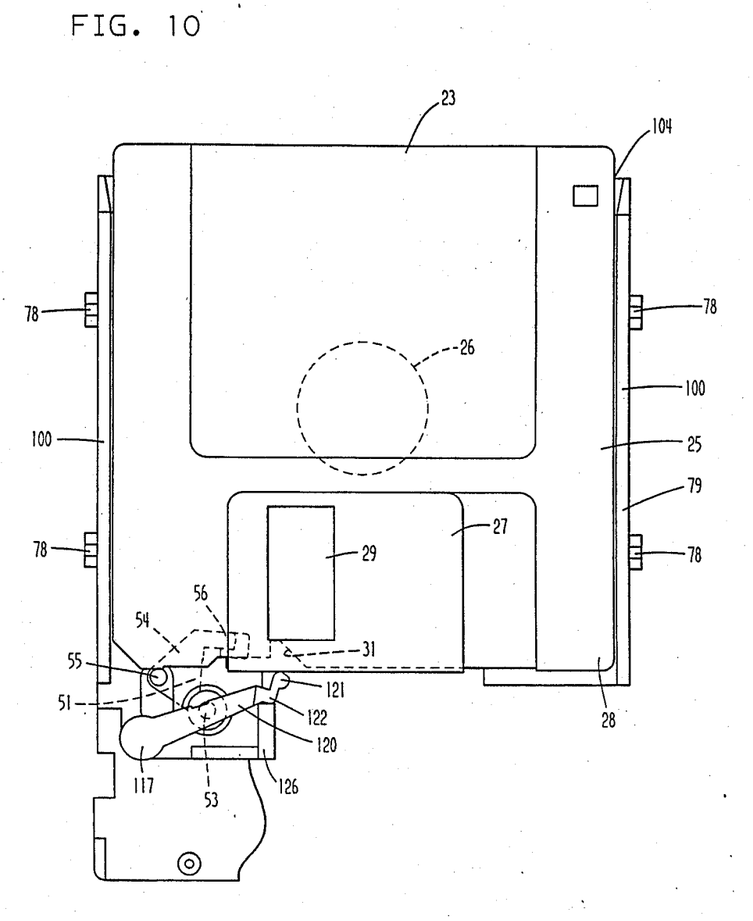
FIG. 10 is a partial top view similar to that of FIGS. 7 through 9, but illustrating blocking of complete cartridge insertion when the shutter on the cartridge remains in a closed position during insertion of the cartridge.

Operation to load and unload a cartridge into and out of the device of this invention is shown in FIGS. 7 through 9, with FIG. 10 illustrating a condition under which loading of the cartridge is precluded by the device of this invention. All loading and unloading is accomplished using sliding motion, and there are no roller elements.

For loading of a cartridge into the device, the cartridge is inserted into the cartridge receiving area, which opens to the front of the device, with the end portion of the cartridge having the shutter thereat being first inserted into the device. The cartridge inserting direction is, therefore, from front to rear (and hence the cartridge ejecting direction is from rear to front) of the device.

As brought out hereinabove, the carrier assembly, or unit, 17 is constrained by ears 76 and 77 and side blocks 78 so that the carrier unit can slide only toward and away from the base unit (i.e., only upwardly and downwardly in a vertical direction toward and away from the base unit when the carrier unit is positioned above the base unit).

The carrier unit is spring loaded toward the base unit by the carrier return springs 81. The carrier unit is, however, held in the up (or unloaded) position, against the return springs, by lifter mechanism 20 when the lifter mechanism is in a first (or rearmost) position so that the carrier unit is supported by flat portions 66 of members 62 of the lifter mechanism. The lifter mechanism is held in this position by latch 56 of latch mechanism 51 against the bias provided by return spring 59. Lifter mechanism 20 is constrained by tabs 45 (slidably received in lipped holders 44) so that the lifter mechanism can move only in a horizontal plane from front to rear along and with respect to casting 19 (when the casting is upright as shown in FIGS. 1 through 3).

As the cartridge is pushed toward the rear of the cartridge area 104, the casing is brought toward contact with shutter actuator 117, as indicated in FIG. 7, so that an accessible shoulder and the edge of the shutter at the shuttered end of the cartridge casing are brought into engagement with the shutter actuator. Continued inserting movement of the cartridge causes leg 120 of shutter actuator 117 to pivot and, in so doing, foot 121 pushes, or slides, shutter 27 on the cartridge towards the open position, as indicated in FIG. 8. This exposes the media (diskette 24 within the cartridge) to the read/write head (or heads). This opening movement of shutter 27 also allows the toe of foot 121 of the shutter actuator 117 to fall into depression, or notch, 31 in the cartridge, which is necessary to allow further rearward movement of the cartridge.

During the last portion of cartridge travel in the inserting direction, the end portion of the cartridge (having the shutter thereat) contacts post 55 on latch mechanism 51. Further movement then causes the latch to rotate against return spring 57 thereby releasing the lifter mechanism, as indicated in FIG. 9, at full insertion of the cartridge. The lifter mechanism return spring 59 then causes the lifter mechanism to slide from the rearmost position toward the front of the drive. This forward movement of the lifter mechanism (i.e., from the rearmost toward the front of the device) is stopped by eject button mechanism 69 to establish the foremost position of the lifter mechanism.

When the lifter mechanism slides forward, the carrier unit is no longer supported on the flat portions 66 of members 62 of the lifter mechanism, and carrier return springs 81 pull the carrier unit downwardly toward the base unit. This downward motion also moves the cartridge downwardly (when a cartridge is within the cartridge area of the carrier unit) and positions the cartridge on the locating posts 75 extending upwardly on casting 19. The carrier unit and cartridge are now in the cartridge loaded position (in which position, reading and writing are enabled). This cartridge loaded position also locates the diskette present magnet (within lower carrier 79) in the appropriate relationship to Hall effect sensor 87 to indicate that the cartridge is loaded.

If, during the cartridge insertion process, shutter actuator 117 does not slide shutter 27 on the cartridge to the open position, or if the cartridge has been improperly inserted, the toe at foot 121 of the shutter actuator will not fall into the depression, or notch, 31 in the cartridge. When this occurs, the heel 122 of shutter actuator 117 contacts stop surface 126 (which is mounted on lower carrier 79), as indicated in FIG. 10. This toe and heel arrangement at the end of leg 120 of shutter actuator 117 thereafter prevents the cartridge from being inserted far enough into the device to trip the latch, which prohibits the cartridge from being moved to the cartridge loaded position, and thus prevents possible damage to the heads.

To eject a cartridge from the cartridge loaded position, the process is essentially reversed. The eject cycle is initiated by depressing eject button 70 located at the front of the device. As button 70 is depressed, the botton eject mechanism 69 is moved rearwardly, which causes lifter mechanism 20 connected therewith to also slide rearwardly (from the foremost position toward the rearmost position of the lifter mechanism).

As the lifter mechanism slides rearwardly (i.e., towards the rear of the device), the ramps 64 and 65 on the lifter mechanism are successively brought into contact with the lift profiles 114 on the bottom surface of lower carrier 79 so that such rearward motion of the lifter mechanism causes profiles 114 on the lower carrier to climb up the lifter ramps. Since the carrier unit is constrained to movement toward and away from the base unit, this rearward motion of the lifter mechanism causes the carrier to be forced upwardly in a vertical direction away from the casting. The eject button must be depressed a sufficient distance so that the carrier unit is secured in the up (or unloaded) position by lifter mechanism 20. If the button is not sufficiently depressed, the carrier unit will return to the loaded position.

When button 70 has been sufficiently depressed, arm 54 of latch mechanism 51 is freed to rotate and, when rotated, falls into latch notch 68 in the lifter mechanism. As the latch mechanism rotates, upwardly projecting post 55 contacts the end portion of the cartridge (i.e., the end portion having the shutter thereat). Further latch rotation pushes the cartridge toward the front of the device. After the cartridge has been pushed far enough forward to release end 121 of shutter actuator 117 from depression 31 in the cartridge, this allows the shutter return spring within the cartridge (not shown) and shutter actuator return spring 124 to eject the cartridge still further so that the end portion of the cartridge opposite to that having the shutter thereon can be easily grasped for manually completing removal of the cartridge from the device.

Cartridge drag spring 106, positioned at the upper carrier plate, places a slight drag on the cartridge to control the distance the cartridge is ejected by the springs. During the eject cycle, rotation of the latch mechanism is also restricted by the lifter mechanism. This prevents the cartridge from being prematurely ejected from the device before the latch release position is reached to prevent possible damage to the head (or heads).

As can be appreciated from the foregoing, the device and method of this invention provides improved cartridge handling utilizing only sliding motion and without requiring roller elements, with initiation of cartridge ejection requiring only a relatively short stroke and low force, and results in a device that has high reliability and can be assembled by automation.

What is claimed is:

1. A cartridge handling device for positioning a cartridge that includes a casing having a flexible diskette therein, said casing also having a central aperture for enabling driving of said diskette therethrough, head access means in one portion, notch means in an edge of said one portion, and a moveable shutter at said one portion covering said head access means and notch means when in a closed position and uncovering said head access means and notch means when in an open position, said cartridge handling device comprising:

carrier means having a cartridge receiving area for receiving said cartridge when inserted into said cartridge area in a predetermined cartridge inserting direction;

support means having said carrier means mounted thereon, said support means and said carrier means having cooperable engaging members that are slideable with respect to one another for establishing loading and unloading directions of movement of said carrier means relative to said support means between predetermined cartridge unloaded and loaded positions;

actuating means for causing movement of said carrier means in said loading and unloading directions;

first positioning means connected with said carrier means for engaging at least one of said edge of said cartridge casing and said shutter thereon during a first portion of inserting movement as said cartridge is inserted into said cartridge area when said carrier means is in said cartridge unloaded position, and, responsive to a second portion of inserting movement of said cartridge following said first portion of inserting movement of said cartridge, causing movement of said shutter from said closed position to said open position to permit engagement of said first positioning means with said notch means in said edge of said cartridge casing; and second positioning means connected with said support means to enable said carrier means to slide in said loading direction to the cartridge loaded position responsive to a third portion of inserting movement of said cartridge following said second portion of inserting movement of said cartridge, said first positioning means precluding movement of said carrier means to the cartridge loaded position if said first positioning means does not engage said notch means in said cartridge casing.

2. The cartridge handling device of claim 1 wherein said sliding movement between said engaging members enables movement of said carrier means toward said support means in said loading direction and away from said support means in said unloading direction.

3. The cartridge handling device of claim 1 wherein said actuating means includes first means connected with said carrier means and said support means for biasing said carrier means toward movement in said loading direction, and second means having a lifter member positioned between said carrier means and said support means for causing movement of said carrier means in said unloading direction.

4. The cartridge handling device of claim 3 wherein said first means of said actuating means includes a spring, wherein said carrier means has lower wall means, and wherein said lifter member of said actuating means includes wedging means engagable with said lower wall means of said carrier means to force said carrier means in said unloading direction.

5. The cartridge handling device of claim 3 wherein said second means of said actuating means includes ejection button means connected with said lifter member for causing said movement of said lifter member to initiate ejection of said cartridge.

6. The cartridge handling device of claim 1 wherein said first positioning means includes shutter actuating means pivotally mounted on said carrier means, said shutter actuating means having an arm terminating in an end portion engageable with at least one of said edge of said cartridge casing and said shutter thereon, said end portion being configured to preclude said third portion of said inserting movement of said cartridge necessary to enable movement of said carrier means to said loaded position unless said end portion engages said notch means in said edge of said cartridge casing.

7. A cartridge handling device for positioning a cartridge that includes a casing having a flexible diskette therein, said casing also having a central aperture for enabling driving of said diskette therethrough, head access means in one portion, notch means in an edge of said one portion, and a slidable shutter at said one portion covering said head access means and notch means when in a closed position and uncovering said head access means and notch means when in an open position, said cartridge handling device comprising:

carrier means having a cartridge receiving area opening to the front of the device for receiving said cartridge when inserted into said cartridge area through said front opening;

base means having said carrier means mounted thereon for movement of said carrier means from the cartridge unloaded position in a loading direction toward said base means, and from the cartridge loaded position in an unloading direction away from said base means;

shutter actuating means mounted on said carrier means, said shutter actuating means having one portion engageable with at least one of said edge of said cartridge casing and said shutter thereon during a first portion of inserting movement as said cartridge is inserted into said cartridge area when said carrier means is in said cartridge unloaded position, and, responsive to a second portion of inserting movement of said cartridge following said first portion of inserting movement of said cartridge, causing movement of said shutter from the closed position to the open position to permit engagement of said shutter actuating means with said notch means in said edge of said cartridge casing;

biasing means biasing said carrier means toward said base means;

lifter means mounted on said base means between said base means and said carrier means, said lifter means precluding movement of said carrier means toward said base means when in a first position and enabling movement of said carrier means toward said base means when in a second position; and lifter actuating means connected with said base means for causing movement of said lifter means from said first position to said second position responsive to a third portion of inserting movement of said cartridge following said second portion of inserting movement of said cartridge, said shutter actuating means and said base means including means for precluding said third inserting movement of said cartridge and therefore precluding movement of said carrier means to the cartridge loaded position if said cartridge has not been properly inserted, if said shutter has not been moved to the open position, and if said one portion of said switch actuating means is not in engagement with said notch means in said cartridge casing.

8. The cartridge handling device of claim 7 wherein said carrier means includes a carrier plate having side walls extending upwardly therefrom at opposite sides thereof, and a top plate extending over said carrier plate, said carrier plate, side walls, and top plate defining said cartridge area, said carrier means having abutment means thereon at said side walls, and said base means having guide surfaces thereon slidingly engageable by said abutment means to constrain said carrier means to said movement in said loading and unloading directions with respect to said base means.

9. The cartridge handling device of claim 7 wherein said base means and said lifter means include cooperating means that are slidingly engagable with one another for constraining movement of said lifter means relative to and between said base means and said carrier means in said first and second directions, which directions are along said base means in a direction normal to said loading and unloading directions of movement of said carrier means relative to said base means.

10. The cartridge handling device of claim 7 wherein said lifter means includes button ejection means at the front portion thereof for causing movement of said lifter means from said second position toward said first position to initiate ejection of a cartridge when in said loaded position, said lifter means including ramp means engagable with a portion of said carrier means facing said base means for causing movement of said carrier means in said unloading direction when said lifter means is moved from said second position to said first position.

11. A cartridge handling device for positioning a cartridge that includes a casing having a flexible diskette therein, said casing also having a central aperture for enabling driving of said diskette therethrough, head access means in one portion, notch means in an edge of said one portion, and a slidable shutter at said one portion covering said head access means and notch means when in a closed position and uncovering said head access means and notch means when in an open position, said cartridge handling device comprising:

carrier means having a carrier plate with spaced side walls extending upwardly from opposite sides thereof and a cover spaced above said carrier plate so that said carrier plate, side walls, and cover establish a cartridge receiving area accessible from the front of the device, said carrier means having abutment members, extending outwardly from said side walls, and a shutter actuator, mounted for pivotal movement at the rear portion of said carrier means, said carrier means also having a leg member, terminating in a foot member within said cartridge area, and a shutter spring, biasing said foot member toward the front of the device, said foot member engaging said edge of said cartridge casing, when said cartridge is inserted sufficiently into said cartridge area, with continued inserting movement of said cartridge causing movement of said shutter from the closed position to the open position;

base means having said carrier means mounted on the upper side thereof, said base means including guide members slidably engageable with said abutment members on said carrier means to constrain said carrier means to movement from an unloaded position toward said base means and from a loaded position away from said base means, said base means having a latch member pivoted thereon with said latch member having a latching portion engageable with said carrier means to releasably maintain said carrier means in said cartridge loaded position, and a latch spring for biasing said pin toward the front of said device; and a lifter mechanism slidably mounted on said base means below said carrier means, said lifter mechanism having movement restraining means thereon cooperable with movement restraining means on said carrier means to constrain movement of said lifter mechanism in opposite horizontal directions toward and away from the front of said device, said lifter mechanism being engagable by said latching portion of said latch member to move said lifter mechanism from a first position, precluding movement of said carrier means from said cartridge unloaded position to said cartridge loaded position, to a second position, forwardly of said first position and permitting movement of said carrier means from said cartridge unloaded position to said cartridge loaded position, said lifter mechanism having a button ejector mounted on the front portion thereof, said button ejector extending forwardly from said device to be accessible externally thereof, and said lifter mechanism having ramps thereon extending to flat top portions with said ramps and said flat top portions being engagable with the underside of said carrier means, said flat top portions maintaining said carrier means in said unloaded position when said lifter mechanism is in said first position and said ramps causing lifting movement of said carrier means from said loaded position to said unloaded position when said button ejector is depressed to move said lifter mechanism from said second position to said first position.

12. The cartridge handling device of claim 11 wherein said foot member of said shutter actuator has a heel portion engageable with a stop member on said carrier means to preclude movement of said cartridge to the loaded position if said cartridge is improperly inserted, if said shutter has not been moved to the open position, and if said foot member is not in engagement with said notch means in said edge of said cartridge casing.

13. The cartridge handling device of claim 11 wherein said ramps include a pair of inclined surfaces that are angularly oriented with respect to one another to facilitate ejection of said cartridge.

14. The cartridge handling device of claim 11 wherein said lifter mechanism has a cartridge spring mechanism attached thereto to provide drag to said cartridge when said cartridge is in said cartridge area and to establish a downward bias thereon.

15. A method for positioning a cartridge, having a flexible diskette therein, within a drive apparatus, said method comprising:

providing a cartridge having a flexible diskette therein, a central aperture for enabling driving of said diskette therethrough, head access means in one portion, notch means in an edge of said front portion, and a slidable shutter at said one portion covering said head access means and said notch means when in a closed position and uncovering the head access means and notch means when in an open position;

providing a moveable carrier mounted on a drive apparatus with movement of the moveable carrier being constrained to sliding movement along guides on the drive apparatus in loading and unloading direction between cartridge unloaded and loaded portions, respectively;

sliding said cartridge into a cartridge receiving area of the moveable carrier when the moveable carrier is in the cartridge unloaded position;

providing a lifter mechanism moveable into and out of the path of travel of said moveable carrier in said loading and unloading direction;

utilizing a shutter actuator to slide the shutter of said cartridge to the open position as said cartridge is inserted a substantial distance into the cartridge area with full insertion of the cartridge into the cartridge area being precluded if the shutter does not open, if the cartridge is improperly inserted, and if the shutter actuator is not brought into engagement with the notch means in the cartridge casing;

sliding the lifter mechanism from a first position in the path of travel of said carrier to a second position out of the path of travel of said carrier upon full insertion of the cartridge after the shutter has been moved to the open position and the shutter actuator has been brought into engagement with the notch means in the cartridge casing;

causing the carrier to slide along guides in the drive apparatus from the cartridge unloaded position to the cartridge loaded position after the lifter mechanism has been moved to the second position; and initiating ejection of the cartridge by sliding the lifter mechanism from the second position towards the first position, which movement of the lifter mechanism forces the carrier to slide along the guides in the unloading direction away from the loaded position toward the unloaded position.

16. The method of claim 15 wherein said method includes automatically opening the shutter by providing a pivotable leg having a foot thereon that engages said front edge of the cartridge casing so that said foot slides said shutter to the open position, with said foot being configured to preclude full insertion of said cartridge if the shutter fails to open to allow the foot to engage the notch means in said edge of the cartridge casing.

17. The method of claim 15 wherein said method includes positioning the lifter mechanism between the drive apparatus and the carrier with the lifter mechanism having ramps and a flat top portion above the ramps, and maintaining said carrier in the cartridge loaded position by engagement of the flat top portion with the carrier when the lifter mechanism is in the first position, and causing the ramps to engage the carrier to force the carrier upwardly when the lifter mechanism is moved from the second position to the first position during initial ejection of the cartridge.

18. The method of claim 15 wherein said method includes providing sliding contacts cooperating with said lifter mechanism to constrain the lifter mechanism to sliding movement between the first and second positions in directions normal to the loading and unloading direction of movement of said carrier.

19. A disk cartridge handling device for positioning a cartridge having a casing containing a data record, said casing having a central aperture for driving said record, a head access aperture, a notch in one side, and a movable shutter for covering said head access aperture and said notch when in a closed position, said device comprising:

carrier means having a cartridge receiving area;

support means having said carrier means mounted thereon, said support means and said carrier means having cooperable engaging sliding members for establishing loading and unloading directions of movement;

actuating means for causing movement of said carrier means in said loading and unloading directions;

first positioning means connected with said carrier means for engaging said shutter and one side of said cartridge during a first portion of inserting movement, and, responsive to a second portion of said inserting movement, causing movement of said shutter to an open position to permit engagement of said first positioning means with said notch; and second positioning means connected with said support means to enable said carrier means to slide to the cartridge loaded position responsive to a third portion of inserting movement, said first positioning means precluding movement of said carrier means to the cartridge loaded position if said notch is not properly engaged.

* * * * *